United States Patent [19]
Schmechtig

[11] 3,772,087
[45] Nov. 13, 1973

[54] DEVICE FOR LIQUID FILLING OF VESSELS

[75] Inventor: Paul R. Schmechtig, Nol, Sweden

[73] Assignee: Aktiebolaget Tudor, Stockholm, Sweden

[22] Filed: Nov. 8, 1971

[21] Appl. No.: 196,409

[30] Foreign Application Priority Data
Nov. 10, 1970 Sweden.............................. 15133/70

[52] U.S. Cl.................. 136/162, 136/170, 136/178, 141/326
[51] Int. Cl........................ H01m 1/02, H01m 7/00
[58] Field of Search..................... 136/162, 170, 177, 136/178; 222/188; 141/325, 326; 137/260

[56] References Cited
UNITED STATES PATENTS
3,218,198  11/1965  Havlick............................. 136/170
2,324,999  7/1943  Shinn.................................. 136/178

FOREIGN PATENTS OR APPLICATIONS
635,716  1/1962  Canada.............................. 136/178

Primary Examiner—Donald L. Walton
Attorney—A. Donald Messenheimer

[57] ABSTRACT

A device for simultaneously filling a plurality of vessels such as battery cells from a single location with the amount of liquid added to each vessel being in accordance with the requirement of the vessel without causing the vessel to overflow. Means are provided to limit the upper liquid level to a position below the top of the vessel and to allow the vessel to be vented to the ambient atmosphere at all times except during filling.

4 Claims, 6 Drawing Figures

PATENTED NOV 13 1973 3,772,087
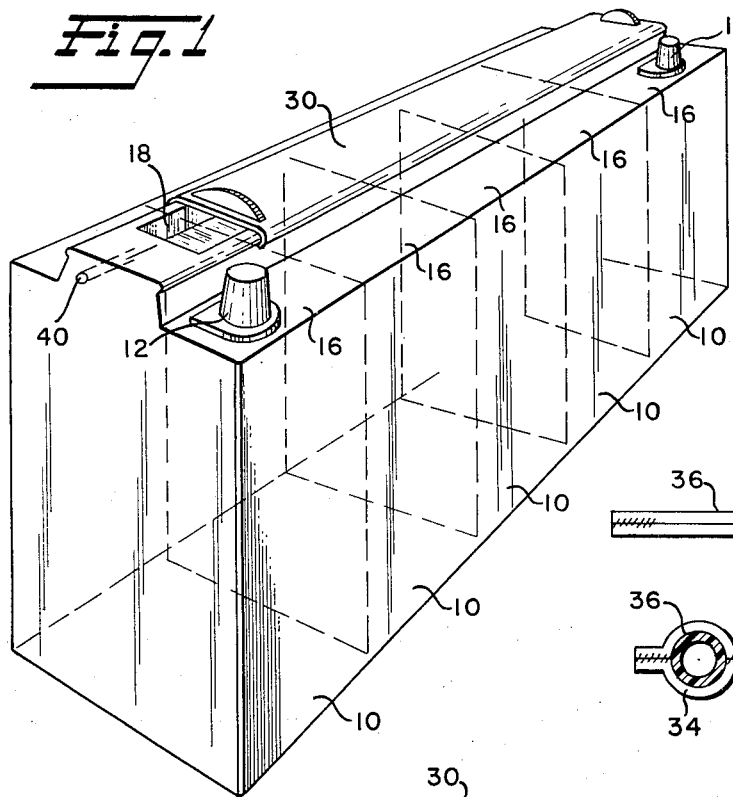
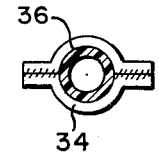
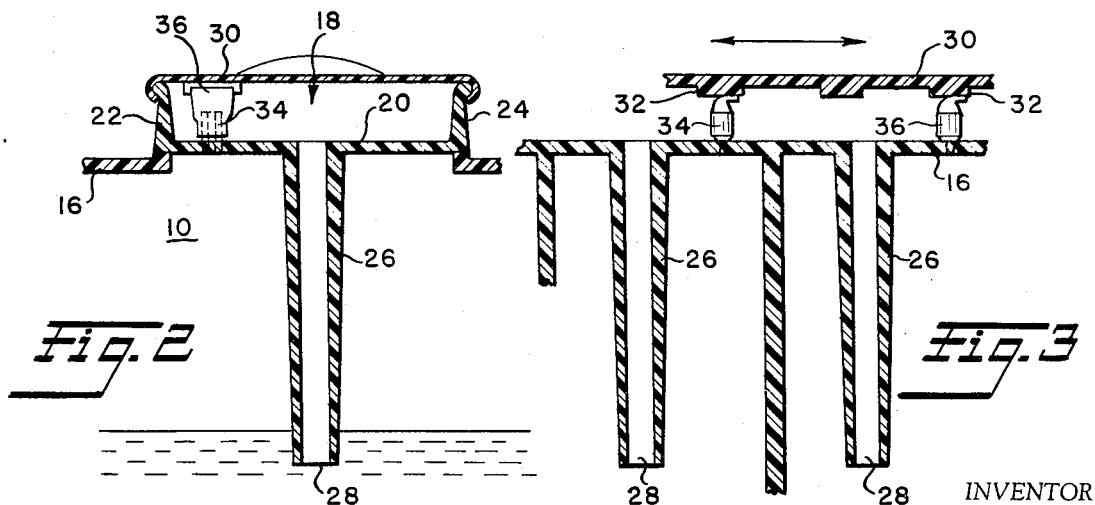
INVENTOR
PAUL R. SCHMECHTIG
BY *Burns Doane Swecker + Mathis*
ATTORNEYS

DEVICE FOR LIQUID FILLING OF VESSELS

The present invention relates to a device for the simultaneous filling up of liquid in a plurality of associated vessels or cells from a single dispensing point, to a predetermined desired level.

The invention especially concerns a device that relates to an electric storage battery comprising a plurality of cells, whereby the desired electrolyte level is produced from time to time, which is important for ensuring reliable functioning of the battery.

Various filling devices are known in the art which have the objective to reduce the labor required for filling and checking the electrolyte level in a multicell storage battery. These known devices have serious drawbacks, however, so that thus far they have not functioned satisfactorily. Most of the devices of the prior art have values which allow liquid to be added and that are closed by hydrostatic pressure with rising liquid level in the cell, and embody movable sealing devices such as value wedges or balls that can lose their sealing ability through wear, or which can undergo substantial functional deterioration through the effect of dirt or salt crystals, resulting in unequal filling of the individual cells.

There are also presently known filling devices that operate with an air pipe which extends down into the cell and prevents the liquid level from rising, so long as the lower opening of the pipe is closed by liquid, because counterpressure is developed in the upper part of the cell. On the other hand, gas cannot escape, which is an undesirable condition in storage battery cells, for well-known reasons.

Since battery operated vehicles are becoming more common, the invention solves a pressing problem. In battery driven cars, the batteries are generally disposed under the vehicle and they are not readily accessible for this reason. It is also desirable that the starting batteries be mounted in such a way that it will not be necessary to have the whole upper side of the battery accessible. It is known that the liquid level can be held constant, but the prior art utilizes a closed electrolyte circulation piping system that contains pumps and valves. The prior devices used in individually filling each cell in turn do not solve the problem.

A major object of the present invention is to provide a novel apparatus allowing for the filling of a plurality of vessels such as battery cells from a single point, whereby the vessels do not need to be accessible to the location of the filling device.

Another object is to provide a novel liquid-filling device which operates without mechanically movable parts and which makes it possible to fill up a large number of liquid containing vessels such as storage battery cells from a single dispensing location.

A further object of the present invention is to provide a novel combination of a multiple vessel arrangement having means for simultaneously filling all of the vessels from one receptacle and a valving arrangement that puts the individual vessel into communication with the ambient atmosphere.

The filling device of the invention is characterized essentially in that the plurality of vessels such as battery cells or the like have their filling openings connected to a common receptacle disposed above them and equipped with a cover such as a sliding lock. This liquid receptacle needs to be accessible only at one point, and therefore the embodiment illustrated is provided with a slide lock that lays open a filling opening in the said liquid receptacle. Each vessel or cell has an air exhaust tube that is closed when the slide lock is open, and which is opened again when the slide lock is restored to its closed position. The air exhaust pipe comprises a rigid tubular element that does not extend all the way to the slide lock, with a flexible tubular piece of relatively soft material mounted thereon. To close the air exhaust pipe, this piece of flexible tubular material is deformed by shoulders disposed on the lower side of the slide lock when the said slide lock is in the filling position. The flexible tube is then bent at a 90° angle and is thus compressed. Upon filling of the liquid into the common liquid receptacle, the liquid runs down into the several cells until the rising level of the liquid closes the filling tube belonging to the respective cell, whereafter the level only rises in the tube and filling is discontinued as soon as any liquid remains in the common liquid receptacle.

It is desirable that each vessel or cell be furnished with a separate lock that can be arranged as a slide lock or a turning lock, and by sliding or partial turning, a liquid filling opening can be opened in the same manner as hereinbefore described. An important part of the invention consists, however, in that several cells can be serviced simultaneously whereby, with a single displacement of the lock, all the cells are closed off from any communication with the ambient atmosphere other than that which may occur at the fill tube of the respective cells, so long as this tube is not closed off by the rising liquid. The common lock advantageously effects a liquid-tight seal in the closed position, and it is therefore desirable, on the other hand, to furnish the liquid receptacle with an opening that limits the liquid level of the said receptacle when all the cells are filled and which, on the other hand, ensures the communication of the cells with the ambient atmosphere.

Other objects and advantages will become apparent from the claims, and from the description as it proceeds in connection with the drawings wherein:

FIG. 1 is a pictorial drawing of a multicell storage battery such as is commonly used in operation of a vehicle, containing 25 cells, only five of which are illustrated;

FIG. 2 is an elevation in partial section illustrating the upper part of one of the storage battery cells;

FIGS. 3 and 4 are elevations in partial section showing the structure of the cover and receptacle; and FIGS. 5 and 6 show a preferred embodiment of the flexible tube of the valve.

Referring now to the drawings, the vessels 10 may each be a cell for a storage battery having a liquid electrolyte. The walls between the adjacent cells are indicated by dashed lines in FIG. 1. The battery is shown with a positive terminal 12 and a negative terminal 14. The remaining battery details are not illustrated since they are known in the art.

The upper wall 16 of each vessel 10 is illustrated as serving as the top wall of the battery and may be one integral member. A liquid receptacle 18 is provided along the upper wall 16 and may comprise a trough having a bottom surface 20 with side walls 22 and 24, as best shown in FIG. 2. The trough extends over each of the vessels or cells 16, and is provided with a depending tube 26 having its lower end 28 located in the vessel or cell well below the upper wall 16. A separate tube 26 is provided for each vessel or cell, and as will be described below, it serves as a means for controlling the maximum height of the liquid in the cell during a filling operation. Receptacle 18 may conveniently be made of the same material as the upper wall 16 and either fabricated as a separate part or molded as an integral part thereof.

A normally closed cover 30 for receptacle 18 is provided to keep the receptacle clean. In the illustrated embodiment, the cover 30 comprises a plate mounted for sliding movement and constitutes a slide lock. On the underside of cover 30 are a plurality of shoulders 32.

On the lower surface 20 of receptacle 18 and above each vessel or cell, a rigid tube 34 is provided which extends through the wall 16 and provides a fluid communication channel between the ambient atmosphere and the interior of the vessel or cell 10. On the upper end of each tube 34 is a flexible hose tube of a soft flexible material that reaches upwardly to the immediate vicinity of the underside of the slide lock cover 30 so that shoulders 32 can deform the flexible hose tube 36, as shown in FIG. 3, to close the tube and seal the air channel through tube 34. When the slide lock cover 30 is in its normal, closed position, the flexible hose tube 36 is open. The tubes 34 and 36 together with shoulders 32 thus serve as a valve which is normally open, but closed during a filling operation.

The flexible hose tube 36 may be formed by two strips of plastic film that are welded together along the sides, as illustrated in FIG. 5. The plastic material may, for example, be polyethylene. After placement on tube 34, the tube 36 assumes the form as illustrated in FIG. 6.

As illustrated in FIG. 1, an overflow or run-off channel 40 may be provided to limit the amount of liquid that can remain in receptacle 18. Channel 40 also serves as an air exhaust vent since hoses 36 vent into receptacle 18.

In normal operation, cover 30 is closed and tubes 36 are open to vent the vessels or cells 10 to the atmosphere. At periodic intervals when liquid is to be added to each vessel or cell 10, cover 30 is slid to a position, as illustrated in FIGS. 1 and 3, to thereby open receptacle 18 and close tubes 36. When liquid is poured into receptacle 18, it flows into each of the vessels until the liquid level rises sightly above the lower ends 28 of tubes 26. At that time, air in the upper part of the vessel or cell becomes compressed and stops the further inflow of liquid until the air vents are opened by the action of closing cover 30. Shoulders 32 can be provided so that flexible hose tubes 36 can be closed by movement of cover 30 in either direction. After the cover 30 is moved to be in its closed position, any residual liquid in tubes 26 and in the receptacle 18 will be immediately added to the vessels.

As a result of the foregoing, it is apparent that all of the vessels or cells can be supplied with the precise amount of liquid needed by simply adding liquid to receptacle 18 until it overflows through vent 40. At that time, cover 30 may be closed and the liquid consuming apparatus in the vessels or cells operated just as if they had individual fill caps.

The present invention may be embodied in other specific forms without departing from the spirit or essential characteristics thereof. The presently disclosed embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. Apparatus for the simultaneous filling of liquid into a plurality of associated vessels from a single dispensing location comprising a plurality of vessels each having separate means for controlling the level of liquid when filled by said filling apparatus to a predetermined level lower than the top wall of said vessel and a normally open air exhaust valve including a hose tube of flexible material communicating with said vessel at a point above the highest expected liquid level; a liquid receptacle that is common to each of said vessels disposed above each of said vessels whereby liquid supplied to each vessel is controlled by the controlling means in each vessel; means including a tube means extending from the receptacle through a top wall of said vessel and having a lower end extending down into said vessel a selected distance below the top vessel wall whereby filling of the vessel substantially above the lower end of the tube means is prevented when said air exhaust valve is closed; and a normally closed slidable cover on said receptacle, said cover having at least one downwardly projecting shoulder arranged to bend said flexible tube and close all of said exhaust valves when the cover is opened to thereby prevent venting of the vessel to the atmosphere during a filling operation.

2. Apparatus as defined in claim 1 wherein all of said vessels have a common upper wall, and the receptacle is integral with the common upper wall.

3. Apparatus for the simultaneous replenishment of liquid electrolyte in multiple cells of an electric storage battery from a single dispensing location comprising one or more batteries each having separate cells with each cell having means for controlling the level of liquid when filled by said filling apparatus to a predetermined level lower than the top wall of said cell and a normally open air exhaust valve including a hose tube of flexible material at a point above the highest expected liquid level for venting the cell to the ambient atmosphere; a liquid receptacle that is common to each of said cells disposed above each of said cells whereby liquid supplied to said receptacle is distributed to each of said cells and the amount of liquid added to each cell is controlled by the controlling means in each cell; said controlling means including a tube means extending from a bottom wall of the receptacle through a top wall of said cell and having a lower end extending down into said cell a selected distance below the top cell wall whereby filling of the cell substantially above the lower end of the tube means is prevented when said air exhaust valve is closed; and a normally closed slidable cover on said receptacle, said cover having at least one downwardly projecting shoulder arranged to bend said flexible tube and close all of said air exhaust valves when the cover is opened to thereby prevent venting of the cell to the atmosphere during a filling operation.

4. Apparatus as defined in claim 3 wherein all of said cells have a common upper wall, and the receptacle is integral with the common upper wall.

* * * * *